(12) United States Patent
Liu

(10) Patent No.: US 12,497,663 B2
(45) Date of Patent: Dec. 16, 2025

(54) METHOD OF MONITORING TREATMENT

(71) Applicant: LDN Pharma Limited, England (GB)

(72) Inventor: Wai Liu, London (GB)

(73) Assignee: LDN Pharma Limited, London (GB)

( * ) Notice: Subject to any disclaimer, the term of this patent is extended or adjusted under 35 U.S.C. 154(b) by 1077 days.

(21) Appl. No.: 17/435,898

(22) PCT Filed: Mar. 6, 2020

(86) PCT No.: PCT/EP2020/056112
§ 371 (c)(1),
(2) Date: Sep. 2, 2021

(87) PCT Pub. No.: WO2020/178446
PCT Pub. Date: Sep. 10, 2020

(65) Prior Publication Data
US 2022/0177975 A1 Jun. 9, 2022

(30) Foreign Application Priority Data
Mar. 6, 2019 (EP) ..................................... 19161138

(51) Int. Cl.
*C12Q 1/6886* (2018.01)

(52) U.S. Cl.
CPC ..... *C12Q 1/6886* (2013.01); *C12Q 2600/106* (2013.01); *C12Q 2600/156* (2013.01)

(58) Field of Classification Search
CPC ............ C12Q 1/6886; C12Q 2600/106; C12Q 2600/156; A61K 45/06; A61P 35/00; G01N 33/574; G01N 2333/7051; G01N 2800/52

See application file for complete search history.

(56) References Cited

U.S. PATENT DOCUMENTS

2008/0015211 A1* 1/2008 Smith ................ A61K 31/4748
514/789
2017/0119755 A1* 5/2017 Dalgleish ................ A61P 35/00

FOREIGN PATENT DOCUMENTS

| JP | 2016-524602 A | 8/2016 |
| WO | 2014/181131 A1 | 11/2014 |
| WO | 2018/178676 A1 | 10/2018 |

OTHER PUBLICATIONS

Atlas ("ASAP1", The Human Protein Atlas, version 18 (2017)) (Year: 2017).*
Ferrante (Diabetes, Obesity and Metabolism 15.s3 (2013): 34-38) (Year: 2013).*
Li (Psychopharmacology 195 (2008): 479-486) (Year: 2008).*
Alfa (European Journal of Cancer 47.16 (2011): 2403-2407) (Year: 2011).*
Hagland (Anticancer Research 37.2 (2017): 675-683) (Year: 2017).*
Wang (Pharmacol. Mar. 2016; 173(5): 856-869) (Year: 2016).*
Kjome (Research and Treatment vol. 5, Jan.-Dec. 2011) (Year: 2011).*
Greeneltch (The Journal of Immunology 175.8 (2005): 4999-5005) (Year: 2005).*
Atlas2 ("BIRC3", The Human Protein Atlas, version 18 (2017)) (Year: 2017).*
Atlas3 ("EIF3E", The Human Protein Atlas, version 18 (2017)) (Year: 2017).*
Le (Cellular and molecular life sciences 74 (2017): 1835-1858) (Year: 2017).*
Ling (Journal of Biological Chemistry 276.22 (2001): 18908-18914) (Year: 2001).*
Tanoue, Takuji, Japan Office Action, JP2021-552878, Japan Patent Office, May 28, 2024.
Weisser, Dagmar, International Search Report and Written Opinion, European Patent Office, PCT/EP2020/056112, Apr. 17, 2020.
Liu et al., "Naltrexone at low coses upregulates a unique gene expression not seen with normal doses: Implications for its use in cancer therapy," Int'l. J. of Oncol., 49(2):793-802, Aug. 1, 2016.
Wang et al., "Comparative analysis of transcriptional profiling of CD3+, CD4+ and CD8+ T cells identifies novel immune response players in T-Cell activation," BMC Genomics, 9:225, May 16, 2008.

\* cited by examiner

*Primary Examiner* — Nancy J Leith
*Assistant Examiner* — Kyle T Rega
(74) *Attorney, Agent, or Firm* — Gavrilovich, Dodd & Lindsey LLP

(57) ABSTRACT

The invention relates to a method for monitoring the treatment of a subject undergoing therapy with an active that is naltrexone or a metabolite or analogue thereof, comprising:
measuring the gene expression profile of any of the genes listed in Table 1 or Table 2, in a sample of CD3+ cells obtained from the subject undergoing treatment;
wherein if the expression of any of the genes in Table 1 is increased compared to a control, or if any of the genes listed in Table 2 is decreased compared to a control the active is being administered at an effective level.

20 Claims, 1 Drawing Sheet

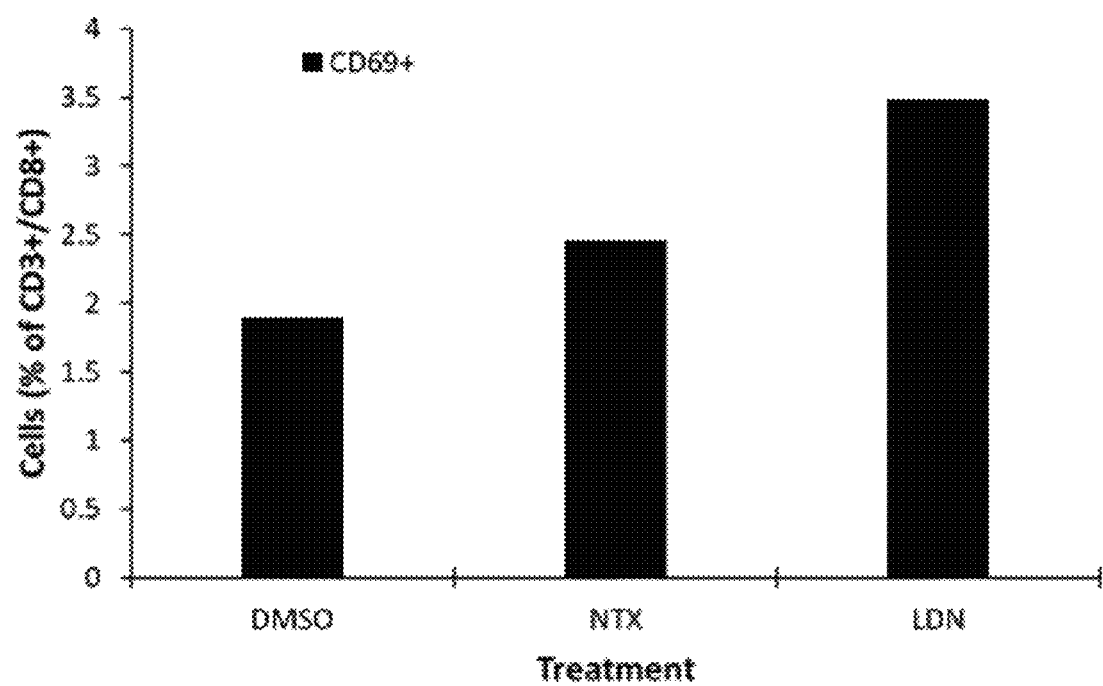

METHOD OF MONITORING TREATMENT

CROSS REFERENCE TO RELATED APPLICATIONS

This application is a U.S. National Stage Application filed under 35 U.S.C. § 371 and claims priority from International Application No. PCT/EP2020/056112, filed Mar. 6, 2020, which application claims the benefit of European Patent Application No. 19161138.3, filed Mar. 6, 2019, the disclosures of which are incorporated herein in their entirety by reference.

FIELD OF THE INVENTION

The invention relates to methods of monitoring treatment of a subject by monitoring expression profiles of particular genes.

BACKGROUND OF THE INVENTION

The success of many cancer therapies is based upon co-administration of an active compound targeting the cancer alongside adjuvant-type molecules. Without any independent therapeutic utility, adjuvants are responsible for priming the immune system of a subject such that the active compound targeting the cancer can achieve maximum therapeutic effect.

As adjuvants typically modulate the immune response of a patient, they are used most commonly in conjunction with cancer vaccines or biologics such as humanized therapeutic antibodies. They act either to enhance the immune system of a patient to increase the production of antibodies in response to challenge with a cancer vaccine, or by suppressing or lowering the immunogenicity of the patient towards a foreign therapeutic antibody. Thus, adjuvants play an important role in driving immune cancer therapies towards a successful therapeutic outcome.

Often, adjuvants will be combined with more traditional cancer therapies such as radiotherapy or chemotherapy resulting in a synergistic treatment whereby the efficacy of the therapy is significantly increased due to the presence of the adjuvant. Therefore, the amount of the traditional cancer therapies used can be reduced, which is beneficial as many cancer therapies are associated with negative side-effects when administered in high doses.

Due to the many varying factors that affect the effect the therapies are having on the body, such as the age, gender, height and weight of a patient as well as environmental factors, it is difficult to know if therapeutics and adjuvants are being administered at an effective level. Furthermore, traditional cancer therapies frequently result in negative side-effects experienced by the patient, which can be exacerbated by non-optimum doses, which again can vary in different patients.

Thus, there is a need to develop new treatment regimens that enable monitoring the effect that the therapies are having on individual patients to ensure that patients are receiving optimum treatment dosages. If it is apparent from the monitoring that this is not the case, then the amount of the therapeutic drug administered can be altered accordingly to help the treatment to be as effective as possible whilst minimising the negative side-effects of the therapies.

SUMMARY OF THE INVENTION

It is known that co-administration of naltrexone alongside a chemotherapeutic agent, results in a reduction in cancer cell growth compared to administering a chemotherapeutic agent alone. However, there is presently no simple way of monitoring if the naltrexone is being administered at an effective level to further reduce the cancer growth caused by the chemotherapeutic agent.

It has been previously reported by the present inventors that low dose naltrexone has advantages during medical treatment over previously used higher dosage regimes. It has now been found by the present inventors that treatment using a low dose of an active that is naltrexone or a metabolite or analogue thereof increases the expression of the genes listed in Table 1 and decreases the expression of the genes listed in Table 2 in a subject's CD3+ cells when given at an appropriate level. Further, the inventors have found that at said expression levels of said genes, the CD3+ cells have increased activity. However, higher doses of naltrexone administration have the opposite effect or no effect at all on the expression of these genes in CD3+ cells and thus their activity. Therefore, the levels of expression of these genes can be measured and monitored to determine if the active is being administered in a low dose and at an effective level.

According to a first aspect of the invention, there is provided a method for monitoring the treatment of a subject undergoing therapy with an active that is naltrexone or a metabolite or analogue thereof, comprising:
  measuring the gene expression profile of any of the genes listed in a):
  a) i. S100 calcium binding protein A6, mRNA;
  ii. RAS protein activator like 3, mRNA;
  iii. Mitogen-activated protein kinase kinase kinase kinase 1, mRNA;
  iv. Tyrosine 3-monooxygenase/tryptophan 5-monooxygenase, mRNA;
  v. DR1-associated protein 1 (negative cofactor alpha 2), mRNA;
  vi. Castor zinc finger 1, transcript variant 2, mRNA;
  vii. Aldehyde dehydrogenase 4 family, member A1, mRNA;
  viii. Phenylalanine hydroxylase, mRNA;
  ix. Myosin, light polypeptide kinase, transcript variant 5, mRNA;
  x. Eukaryotic translation initiation factor 4B, mRNA;
  xi. Olfactory receptor, family 10, subfamily A, member 6, mRNA;
  xii. Ezrin, transcript variant 1, mRNA;
  xiii. Actin, beta, mRNA;
  xiv. PRP8 pre-mRNA processing factor 8 homolog (*S. cerevisiae*), mRNA;
  xv. Integrin, beta 2 (complement component 3 receptor 3 and 4), mRNA;
  xvi. Hippocalcin-like 1, transcript variant 2, mRNA;
  xvii. Sparc/osteonectin, cwcv and kazal-like domains proteoglycan 2, mRNA;
  xviii. Poliovirus receptor-related 2 (herpesvirus entry mediator B), mRNA;
  xix. Nucelobindin 1, mRNA;
  or b):
  b) i. WD repeat domain 75, mRNA;
  ii. Baculoviral IAP repeat-containing 3, transcript variant, mRNA;
  iii. CDKN2A interacting protein, mRNA;
  iv. Dynein, light chain, LC8-type 2, mRNA;
  v. Eukaryotic translation initiation factor 2, subunit 3 gamma, mRNA;
  vi. ArfGAP with SH3 domain, Ankyrin repeat and PH domain 1, mRNA;

vii. Potassium channel tetramerisation domain containing 6, mRNA;
viii. Proteasome (prosome, macropain) activator subunit 2, mRNA;
ix. Mortality factor 4 like 1, transcript variant 2, mRNA;
x. Metal-regulatory transcription factor 1, mRNA;
xi. Peroxisomal D3,D2-enoyl-CoA isomerase, transcript, mRNA;
xii. Programmed cell death 4 (neoplastic transformation inhibitor), mRNA;
xiii. Histone cluster 1, H4c, mRNA;
xiv. BCL2-associated transcription factor 1, transcript variant, mRNA;
xv. Eukaryotic translation initiation factor 3, subunit E, mRNA;
xvi. LSM5 homolog, U6 small nuclear RNA associated (*S. cerevisiae*), mRNA;
xvii. H3 histone, family 3A, mRNA;
xviii. Eukaryotic translation initiation factor 3, subunit M, mRNA;
xix. CDC42 small effector 2, transcript variant 2, mRNA;
in a sample of CD3+ cells obtained from the subject undergoing treatment;
wherein if the expression of any of the genes in a) is increased compared to a control, or if any of the genes listed in b) is decreased compared to a control the active is being administered at an effective level.

BRIEF DESCRIPTION OF THE FIGURES

The invention is described with reference to the accompanying drawing, wherein:

FIG. 1: shows the results from Example 2; the CD69 expression of PBMCs cultured with LDN, NTX or DMSO.

DETAILED DESCRIPTION OF THE INVENTION

The invention is based on the finding that the active naltrexone or a metabolite or analogue thereof, when administered at a low dose and at an effective level, increases the expression of the genes listed in Table 1 and decreases the expression of the genes listed in Table 2 in a subject's CD3+ cells. This is exemplified by the compound naltrexone. Thus, by measuring the level of expression of these genes in a subject's CD3+ cells, whilst they are undergoing therapy with naltrexone or a metabolite or analogue thereof, it enables the physician to monitor if the drug is being administered at the desired low dose and at an effective level. Therefore, the present inventors have devised an in vitro method for monitoring the treatment by measuring the expression levels of the genes listed in Tables 1 or 2, which in turn allows the amount of the active naltrexone or a metabolite or analogue thereof being administered to be altered to maximise efficacy and safety.

TABLE 1 genes found to increase their expression levels upon administration of a low dose of an active that is naltrexone or a metabolite or analogue thereof.

| Definition | Symbol |
| --- | --- |
| S100 calcium binding protein A6, mRNA | S100A6 |
| RAS protein activator like 3, mRNA | RASAL3 |
| Mitogen-activated protein kinase kinase kinase kinase 1, mRNA | MAP4K1 |
| Tyrosine 3-monooxygenase/tryptophan 5- monooxygenase, mRNA | YWHAZ |
| DR1-associated protein 1 (negative cofactor alpha 2), mRNA | DRAP1 |
| Castor zinc finger 1, transcript variant 2, mRNA | CASZ1 |
| Aldehyde dehydrogenase 4 family, member A1, mRNA | ALDH4A1 |
| Phenylalanine hydroxylase, mRNA | PAH |
| Myosin, light polypeptide kinase, transcript variant 5, mRNA | MYLK |
| Eukaryotic translation initiation factor 4B, mRNA | EIF4B |
| Olfactory receptor, family 10, subfamily A, member 6, mRNA | OR10A6 |
| Ezrin, transcript variant 1, mRNA | EZR |
| Actin, beta, mRNA | ACTB |
| PRP8 pre-mRNA processing factor 8 homolog (*S. cerevisiae*), mRNA | PRPF8 |
| Integrin, beta 2 (complement component 3 receptor 3 and 4), mRNA | ITGB2 |
| Hippocalcin-like 1, transcript variant 2, mRNA | HPCAL1 |
| Sparc/osteonectin, cwcv and kazal-like domains proteoglycan 2, mRNA | SPOCK2 |
| Poliovirus receptor-related 2 (herpesvirus entry mediator B), mRNA | PVRL2 |
| Nucelobindin 1, mRNA | NUCB1 |

TABLE 2 genes found to decrease their expression levels upon administration of a low dose of an active that is naltrexone or a metabolite or analogue thereof.

| Definition | Symbol |
| --- | --- |
| WD repeat domain 75, mRNA | WDR75 |
| Baculoviral IAP repeat-containing 3, transcript variant, mRNA | BIRC3 |
| CDKN2A interacting protein, mRNA | CDKN2AIP |
| Dynein, light chain, LC8-type 2, mRNA | DYNLL2 |
| Eukaryotic translation initiation factor 2, subunit 3 gamma, mRNA | EIF2S3 |
| ArfGAP with SH3 domain, Ankyrin repeat and PH domain 1, mRNA | ASAP1 |
| Potassium channel tetramerisation domain containing 6, mRNA | KCTD6 |
| Proteasome (prosome, macropain) activator subunit 2, mRNA | PSME2 |
| Mortality factor 4 like 1, transcript variant 2, mRNA | MORF4L1 |
| Metal-regulatory transcription factor 1, mRNA | MTF1 |
| Peroxisomal D3,D2-enoyl-CoA isomerase, transcript, mRNA | PECI |

TABLE 2-continued genes found to decrease their expression levels upon administration of a low dose of an active that is naltrexone or a metabolite or analogue thereof.

| Definition | Symbol |
|---|---|
| Programmed cell death 4 (neoplastic transformation inhibitor), mRNA | PDCD4 |
| Histone cluster 1, H4c, mRNA | HIST1H4C |
| BCL2-associated transcription factor 1, transcript variant, mRNA | BCLAF1 |
| Eukaryotic translation initiation factor 3, subunit E, mRNA | EIF3E |
| LSM5 homolog, U6 small nuclear RNA associated (S. cerevisiae), mRNA | LSM5 |
| H3 histone, family 3A, mRNA | H3F3A |
| Eukaryotic translation initiation factor 3, subunit M, mRNA | EIF3M |
| CDC42 small effector 2, transcript variant 2, mRNA | CDC42SE2 |

It has been found by the present inventors that low dose naltrexone (LDN) has beneficial "priming" effects on the immune system. Thus, LDN is to be used to prime the cells of the immune system prior to treatment with further drugs/therapeutic options.

Priming with LDN as part of a first treatment phase prior to administration of further drugs has been shown by the present inventors in earlier applications that it results in greater cell kill than no priming with LDN phase and continuous LDN administration. However, there is currently no simple method of determining if an appropriate amount of LDN has been administered and thus if the priming effects are present.

Active agents such as naltrexone or a metabolite or analogue thereof when administered to a subject undergoing therapy enhances the cytotoxicity or cytostatic activity of the anti-cancer agent the subject is being treated with. Without wishing to be bound by theory, the increase in the expression levels of the genes in Table 1 or the decrease in the expression levels of the genes in Table 2 is an indication that the CD3+ cell is reacting to the effect of the low dose of the active naltrexone or a metabolite or an analogue thereof and has thus been primed to provide increased CD3+ activity. CD3+ cells are immunological cells that play an important role in the body to fight against disease. Activation of CD3+ cells in turn increase the proliferation of T cells, which are key in the body's defense against disease. Hence, the immune system is effectively boosted. Furthermore, the increase in activity of these cells increases their overall cytotoxicity and subsequently the cytotoxicity of the therapy regimen, which includes administering a further treatment drug. The genes in Tables 1 and 2 are therefore useful markers for identifying if the amounts of the active being administered is at the desired low dose and at an effective level to enhance the cytotoxicity or cytostatic activity of the further treatment drug, which is subsequently administered if the active is at the effective level.

In certain embodiments, the active is provided in an amount sufficient to increase the expression of any of the genes listed in Table 1 in CD3+ cells above the normal basal levels expected in a subject. For example, the active may be administered in an amount sufficient to raise the level of expression of any of the genes listed in Table 1 by at least 5%, at least 10%, at least 20%, at least 30%, at least 40%, at least 50%, at least 60%, 70%, at least 80%, at least 90%, or at least 100%, compared to the normal basal levels expected in the subject. In certain embodiments, the active is provided in an amount sufficient to decrease the expression of any of the genes listed in Table 2 below the normal basal levels expected in a subject. For example, the active may be administered in an amount sufficient to lower the level of expression of any of the genes listed in Table 2 by at least 5%, at least 10%, at least 20%, at least 30%, at least 40%, at least 50%, at least 60%, at least 70%, at least 80%, at least 90%, or at least 100%, compared to the normal basal levels expected in the subject. The "normal" basal level of each gene may be determined by measuring the level of expression of each gene in CD3+ cells in a sample obtained from the subject prior to the administration of the active.

The level of expression of the genes can be measured in the population of cells using any number of analytical methods available to the skilled person, including, but not limited to, quantitative polymerase chain reaction (PCR) technology; real-time PCR; northern-blotting, DNA microarrays or sequencing technologies. One such commercially available example is the Illumina platform with chips surveying the total human genome. The increased or decreased level of expression of a gene can be determined by comparing the level of expression of the gene from before and after administration of the active naltrexone, or a metabolite or an analogue thereof.

In certain embodiments, the biological sample obtained from the subject for use in the method is blood, plasma, serum, lymph fluid, a tissue, or cells derived from a tissue sample, preferably a blood sample. Conventional techniques for obtaining any of the above biological samples from a subject are well known to the person skilled in the art. Being able to use a blood sample provides a convenient and easy platform of measuring the gene expression to then in turn establish if the priming of the immune system has occurred.

The "reference" value for use in the method can be the level of expression of a gene from Tables 1 or 2 determined from a biological sample obtained from a healthy subject. As used herein, a "healthy subject" refers to a subject who is not suffering from cancer or a CNS disorder. The reference value may be determined by measuring the level of expression of a gene from Tables 1 or 2 in the sample obtained from a healthy individual at the time the method of the invention is performed. Alternatively, the reference value may be a pre-determined value from a prior measurement of the level of expression of a gene from Tables 1 or 2 in an equivalent sample obtained from a healthy individual. When monitoring the treatment of the active that increases or decreases the expression of a gene from Tables 1 or 2, the reference value may be that derived from a healthy individual, or the reference value may be the expression level of a gene from Tables 1 or 2 measured in the sample previously obtained from the subject, i.e. the reference value may be the level of expression of a gene from Tables 1 or 2 in a sample obtained from the subject prior to administration of the active.

Comparing the expression of a gene from Tables 1 or 2 of the subject to a reference is used to determine if the amount of active being administered is at a desired low dose and at an effective level. When the expression of a gene from Table 1 is increased compared to the reference or when the expression of a gene from Table 2 is decreased compared to the reference, then the active is being administered at the desired low dose and at an effective level. Contrary, when the expression of a gene from Table 1 is decreased or at the same level compared to the reference or when the expression of a gene from Table 2 is increased or at the same level compared to the reference, then the active is not being administered at the desired low dose and at an effective level. Therefore, the amount of active administered in the treatment regime can be adjusted accordingly, i.e. the amount of active administered is decreased if it is being administered at a dose which is too high and therefore it is not being administered at an effective level.

Suitably the expression of a gene from Tables 1 or 2 is measured at least 24 hours after administration of the active, more suitably at least 48 hours after administration of the active.

The gene expression profile of any one of the genes in Tables 1 and 2 may be measured and compared to its reference value. However, the more genes that are measured and compared to their reference values, the more confidence the skilled person can have in the conclusion for determining if the active is being administered at an effective level. Therefore, in some embodiments the gene expression profile of two or more of the genes is determined, suitably three or more of the genes, preferably four or more of the genes, more preferably five or more of the genes.

In some embodiments, the gene expression profile of one or more, such as two or more, suitably three or more, preferably four or more, more preferably all five of the genes S100A6, RASAL3, MAP4K1, YWHAZ and DRAP1 from Table 1 is determined and/or the gene expression profile of one or more, such as two or more, suitably three or more, preferably four or more, more preferably all five of the genes WDR75, BIRC3, CDKN2AIP, DYNLL2 and EIF253 from Table 2 is determined. In one particular embodiment, the gene expression profile is determined for all of the genes from Table 1 and/or the gene expression profile is determined for all of the genes from Table 2.

Suitably the active is to be administered at a low dose i.e. in an amount effective to increase the blood plasma concentration of the active to at least 0.34 ng/ml, or at least 3.4 ng/ml, or at least 34 ng/ml, or at least 340 ng/ml. In certain embodiments, the active is to be administered in an amount effective to increase the blood plasma concentration of the active to within the range of 0.3 ng/ml to 3,400 ng/ml, preferably to within the range of from 34 ng/ml to 3,400 ng/ml more preferably 340 ng/ml to 3,400 ng/ml. The amount effective to achieve such an amount can be determined using any number of conventional techniques known to the person skilled in the art. For example, the skilled person could perform mass spectrometry on a blood plasma sample obtained from the subject in order to determine the increase in the concentration of the active within the sample after administration of an amount of the active. The effective amount is the amount determined to bring about the desired increase in blood plasma concentration.

In one embodiment, the low dose, i.e. the effective amount, per day of the active employed in the therapy may be from about 0.01 mg to up to 10 mg, preferably from about 0.1 mg to about 8 mg, most preferably from about 1 to about 6 mg of the active; e.g. about 0.01 mg, about 0.05 mg, about 0.1 mg, about 0.3 mg, about 0.5 mg, about 1 mg, about 2 mg, about 3 mg, about 5 mg, about 10 mg, of the active employed per day. In certain embodiments the effective amount per day of the active employed is no more than 4.5 mg, such as from 2 mg to 4.5 mg or from 3 mg to 4.5 mg, preferably 3 mg to 4 mg.

As used herein, the terms "treating" and "treatment" and "to treat" and "therapy" refer to both 1) therapeutic measures that cure, slow down, and/or halt progression of a diagnosed pathologic condition or disorder and 2) prophylactic or preventative measures that prevent and/or slow the development of a targeted pathologic condition or disorder. Thus, those in need of treatment include those already with the disorder; those prone to have the disorder; and those in whom the disorder is to be prevented.

As used herein "naltrexone" refers to morphinan-6-one, 17-(cyclopropylmethyl)-4,5-epoxy-3,14-dihydroxy-(5a), and pharmaceutically acceptable salts, solvates, hydrates, stereoisomers, clathrates and prodrugs thereof. The use of naloxone, a structural analogue of naltrexone, is within the purview of the invention and is encompassed within the term "analogue" used in the description and the claims. Similarly, methylnaltrexone is also envisaged as a suitable analogue for use in all aspects of the invention.

6-β-naltrexol is a major active metabolite of naltrexone, which is encompassed with the term "metabolite" used in the description and claims. As used herein "6-β-naltrexol" refers to 17-(Cyclopropylmethyl)-4,5-epoxymorphinan-3, 6beta,14-triol and pharmaceutically acceptable salts, solvates, hydrates, stereoisomers, clathrates and prodrugs thereof. The term 6-β-naltrexol also encompasses functionally equivalent analogues thereof and metabolites that retain functional equivalence with respect to the novel uses of 6-β-naltrexol embodied within the invention. The preferred form of naltrexone or a metabolite or an analogue thereof is as the hydrochloride salt form.

As used herein, "cytotoxicity" refers to the quality of an agent being toxic to cells. Cytotoxicity may therefore refer to the ability of an agent to induce cell death upon coming into contact with a cell. The cytotoxic mechanism leading to cell death may be due to necrosis or programmed cell death (apoptosis).

Cytotoxicity may be measured in a population of cells using any number of cell viability assays, or by using antibodies specific for protein factors activated upon the initiation of apoptosis.

As used herein, "cytostasis" refers to the inhibition of cell growth and multiplication. Thus, a cytostatic agent may refer to an agent that inhibits the proliferation or growth of a cell, perhaps without causing cytotoxicity. An agent that causes cytostasis can be determined by measuring the DNA content of individual cells within a population of cells. A population of cells undergoing proliferation will have sub-populations of cells with varying levels of DNA content. The DNA content within the cell will be dependent on the phase of the cell cycle within which the cell resides. Where an agent causes cytostasis, the balance of the population of cells within each phase of the cell cycle will be abnormal. For example, if cytostasis occurs in the S phase or $G_2$ phase, an abnormal number of cells will contain twice the content of DNA normally observed in a somatic cell. Conversely, if cytostasis occurs during the $G_0$ or $G_1$ phase, an abnormal number of cells will contain the amount of DNA typically observed in a somatic cell.

As used herein, the term "subject" refers to any animal (for example, a mammal), including, but not limited to, humans, non-human primates, canines, felines, rodents, and the like. Typically, the terms "subject" and "patient" are used interchangeably herein in reference to a human subject.

The subject may be being treated for a number of disorders, as the priming effect of the LDN boosts the immune system, it can be beneficial for use in an array of treatments targeting different diseases. One such example is in patients that have been immunocompromised due to a disease itself (for example HIV/AIDS) or the treatment associated with a disease (for example chemotherapy during cancer treatment). "Immunodeficiency" or "immunocompromised" is a state in which the immune system is weakened or impaired thereby reducing its ability to fight infectious disease. Preferably, the treatment is intended either as, or as part of, a regimen for treating a cancer, preferably in the treatment of breast, lung, melanoma, colon or glioma cancer.

As used herein, the term "HIV" refers to "human immunodeficiency virus", which is a virus that damages the cells in your immune system and weakens your ability to fight everyday infections and disease. "AIDS" refers to "acquired immune deficiency syndrome", which describes a number of potentially life-threatening infections and illnesses that happen when your immune system has been severely damaged by the HIV virus.

Typically, HIV is treated with antiretroviral medicines. As such, after priming with LDN antiretroviral therapy may be administered. Antiretroviral therapy is typically prescribed using three different drug molecules. Examples include nucleoside reverse transcriptase inhibitors (such as abacavir (Ziagen), emtricitabine (Emtriva), lamivudine (Lamivudine RBX, Zefix, Zetlam)), non-nucleoside reverse transcriptase inhibitors (such as delavirdine (Rescriptor), doravirine (Pifeltro), efavirenz (Sustiva)), protease inhibitors (such as atazanavir (Reyataz), darunavir (Prezista), fosamprenavir (Lexiva, Telzir)), entry inhibitors (such as enfuvirtide (Fuzeon), maraviroc (Selzentry)) and integrase inhibitors (such as dolutegravir (Tivicay), elvitegravir (Vitekta), raltegravir (Isentress)).

As used herein, the term "cancer" refers to any mass of tissue that results from excessive cell growth, proliferation and/or survival, either benign (noncancerous) or malignant (cancerous), including pre-cancerous lesions. As used herein, the term "cancer cell" refers to a cell or immortalized cell line derived from cancer.

Typically, cancer treatment includes one or more of chemotherapy, radiation therapy, hormonal therapy or immunotherapy. As such, after priming with LDN cancer treatment may be administered. As used herein "chemotherapy", "chemotherapeutic agent", "radiation therapy", "hormonal therapy" and "immunotherapy" have their conventional meanings in the art. The term "anti-cancer agent" is used synonymously with "chemotherapeutic agent". Combination therapy may be used whereby multiple known therapies are used.

In certain embodiments, the chemotherapy involves administering an anti-cancer agent selected from the group consisting of PI3-kinase inhibitors, AKT inhibitors, taxanes, antimetabolites, alkylating agents, cell cycle inhibitors, topoisomerase inhibitors and cytotoxic antibodies.

Where the chemotherapeutic agent is a PI3-kinase inhibitor, suitable examples include, but are not limited to, wortmannin, LY294002, demethoxyviridin, IC87114, NVP-BEZ235, BAY 80-6946, BKM120, GDC-0941, GDC-9080; including combinations thereof; and pharmaceutically acceptable salts, solvates, hydrates, stereoisomers, clathrates and prodrugs of any of the above.

Where the anti-cancer agent is an AKT inhibitor, suitable examples include, but are not limited to, MK-2206, GSK690693, perifosine, PHT-427, AT7867, honokiol, PF-04691502; including combinations thereof; and pharmaceutically acceptable salts, solvates, hydrates, stereoisomers, clathrates and prodrugs of any of the above.

Where the anti-cancer agent is a taxane, suitable examples include, but are not limited to, paclitaxel and docetaxel; including combinations thereof; and pharmaceutically acceptable salts, solvates, hydrates, stereoisomers, clathrates and prodrugs of any of the above.

Where the anti-cancer agent is an antimetabolite, suitable examples include, but are not limited to, methotrexate, 5-fluorouracil, capecitabin, cytosinarabinoside (Cytarabin), gemcitabine, 6-thioguanin, pentostatin, azathioprin, 6-mercaptopurin, fludarabin and cladribin; including combinations thereof; and pharmaceutically acceptable salts, solvates, hydrates, stereoisomers, clathrates and prodrugs of any of the above.

Where the anti-cancer agent is an alkylating agent, suitable examples include, but are not limited to, mechlorethamine, cyclophosphamide, ifosfamide, trofosfamide, melphalan (L-sarcolysin), chlorambucil, hexamethylmelamine, thiotepa, busulfan, carmustine (BCNU), streptozocin (streptozotocin), dacarbazine (DTIC; dimethyltriazenoimidazol ecarboxamide) temozolomide and oxaliplatin; including combinations thereof; and pharmaceutically acceptable salts, solvates, hydrates, stereoisomers, clathrates and prodrugs of any of the above.

Where the anti-cancer agent is a cell cycle inhibitor, suitable examples include, but are not limited to, Epothilone, Vincristine, Vinblastine, UCN-01, 17AAG, XL844, CHIR-124, PF-00477736, CEP-3891, Flavopiridol, berberine, P276-00, terameprocol, isoflavone daidzein, BI2536, BI6727, GSK461364, Cyclapolin, ON-01910, NMS-P937, TAK-960, Ispinesib, Monastrol, AZD4877, LY2523355, ARRY-520, MK-0731, SB743921, GSK923295, Lonafarnib, proTAME, Bortezomib, MLN9708, ONX0912, CEP-18770; including combinations thereof; and pharmaceutically acceptable salts, solvates, hydrates, stereoisomers, clathrates and prodrugs of any of the above; particularly suitable examples of cell cycle inhibitors include, but are not limited to, Hespaeradin, ZM447439, VX-680, MLN-8054, PHA-739358, AT-9283, AZD1152, MLN8237, ENMD2076, SU6668; including combinations thereof; and other inhibitors of Aurora kinases; and pharmaceutically acceptable salts, solvates, hydrates, stereoisomers, clathrates and prodrugs of any of the above.

Checkpoint inhibitors are a form of cancer immunotherapy with currently approved inhibitors that target the molecules CTLA4, PD-1, and PD-L1.

In another embodiment, the therapy may also include administering Vitamin D to the subject. Vitamin D and the active may be administered concurrently or simultaneously, sequentially or separately, preferably simultaneously.

As used herein, "vitamin D" refers to vitamin D and any intermediate or product of a metabolic pathway of vitamin D that result in a metabolite that is capable of boosting the cytostatic effect of the active. Metabolite may refer to a vitamin D precursor, which can be incorporated into a vitamin D synthetic pathway occurring naturally within the subject to undergo the therapy of the invention. Alternatively, metabolite may refer to a molecule derived from an anabolic or catabolic process that utilizes vitamin D. Non-limiting examples of vitamin D metabolites include ergocalciferol, cholecalciferol, calcidiol, and calcitriol, 1a-hydroxycholecalciferol, 25-hydroxycholecalciferol, 1a,25-hydroxycholecalciferol, 24,25-hydroxycholecalciferol. An "active" metabolite is a metabolite that can be used in the context of the present invention. Dosage regimes of vitamin D or active metabolites thereof will be well known to the person skilled in the art. The term vitamin D also encompasses pharmaceutically acceptable salts of any of the above. A particularly suitable metabolite of vitamin D for use in the present invention is calcitriol.

As used herein, the terms "concurrently" or "simultaneous", "sequential" or "separate" mean that administration of the active and the vitamin D product occur as part of the same treatment regimen.

"Simultaneous" administration, as defined herein, includes the administration of the active and the vitamin D product within about 2 hours or about 1 hour or less of each other, even more preferably at the same time.

"Separate" administration, as defined herein, includes the administration of the active and the vitamin D product, more than about 12 hours, or about 8 hours, or about 6 hours or about 4 hours or about 2 hours apart.

"Sequential" administration, as defined herein, includes the administration of the active and the vitamin D product each in multiple aliquots and/or doses and/or on separate occasions. The active may be administered to the patient before or after administration of the vitamin D product. Alternatively, the vitamin D product is continued to be applied to the patient after treatment with the active ceases.

CD69 is a surface marker that becomes expressed as part of the cell's ability to interact with others. This is a sign that the cell is active or becoming active. Thus, CD69 expression is increased in immune cells, such as CD3+ and T cells, when they are activated. Thus, in a second aspect there is provided a method for monitoring the treatment of a subject undergoing therapy with an active that is naltrexone or a metabolite or analogue thereof, comprising:
   measuring the CD69 expression in a sample of CD3+ cells obtained from the subject undergoing treatment;
   wherein if the CD69 expression is increased compared to a control the active is being administered at an effective level.

The level of expression of CD69 can be measured in the population of cells using any number of analytical methods available to the skilled person, including, but not limited to, gel electrophoresis and Western blot analysis, 2D-PAGE, column chromatography, ribosome profiling or mass spectrometry. All other embodiments described for the first aspect are applicable to the second aspect.

EXAMPLES

Example 1—State of Cells Determined by the Genes that are Expressed and Active after Administration of Naltrexone and Low Dose Naltrexone CD3+ cells were harvested from CD14-ve peripheral-blood mononuclear cells (PBMCs) cultured with naltrexone for 4 h with either 10 nM low-dose naltrexone (LDN) or 10 uM of a conventional higher dose of naltrexone (NTX). The RNA was then extracted from the cells using Trizol then isopropanol. The expression of the genes was measured using Illumina platform with biochips surveying the total human genome. Nonsense genes and those called absent were filtered out leaving 19,571 genes called present for subsequent analysis. The ratio of treated:untreated was calculated and the 25% change from untreated considered relevant. The data was then sorted based on patterns and the effects of the LDN or NTX can either be an increase, reduction or no change in the gene expressions. The genes that are specifically altered by LDN may represent the genes that are relevant to its function, for example there were 223 genes upregulated by LDN but unchanged by NTX. Some of these genes are shown in Table 3 along with the relevant data showing that their expression is up-regulated after administration of LDN whereas their expression is down-regulated or has no change after administration of NTX. Similarly, Table 3 also shows some of the genes along with the relevant data showing that their expression is down-regulated after administration of LDN whereas their expression has no change after administration of NTX.

TABLE 3 exemplary genes analysed and relevant data thereof.

| SYMBOL | UN | NTX | LDN | NTX/UN | LDN/UN | N/U-score | L/U-score | pattern |
|---|---|---|---|---|---|---|---|---|
| S100A6 | 172 | 112 | 240 | 0.655 | 1.397 | D | U | DU |
| RASAL3 | 261 | 186 | 356 | 0.713 | 1.365 | D | U | DU |
| MAP4K1 | 367 | 267 | 475 | 0.726 | 1.294 | D | U | DU |
| YWHAZ | 628 | 462 | 809 | 0.736 | 1.287 | D | U | DU |
| DRAP1 | 247 | 178 | 309 | 0.723 | 1.253 | D | U | DU |
| CASZ1 | 94 | 107 | 167 | 1.130 | 1.775 | o | U | oU |
| ALDH4A1 | 80 | 95 | 135 | 1.184 | 1.691 | o | U | oU |
| PAH | 80 | 95 | 135 | 1.183 | 1.687 | o | U | oU |
| MYLK | 100 | 124 | 166 | 1.241 | 1.659 | o | U | oU |
| EIF4B | 377 | 423 | 594 | 1.123 | 1.576 | o | U | oU |
| OR10A6 | 97 | 120 | 152 | 1.235 | 1.570 | o | U | oU |
| EZR | 779 | 841 | 1218 | 1.079 | 1.563 | o | U | oU |
| ACTB | 100 | 124 | 156 | 1.241 | 1.560 | o | U | oU |
| PRPF8 | 301 | 353 | 464 | 1.174 | 1.543 | o | U | oU |
| ITGB2 | 471 | 443 | 719 | 0.942 | 1.528 | o | U | oU |
| HPCAL1 | 324 | 275 | 491 | 0.849 | 1.515 | o | U | oU |
| SPOCK2 | 889 | 1061 | 1322 | 1.194 | 1.487 | o | U | oU |
| PVRL2 | 102 | 113 | 151 | 1.102 | 1.483 | o | U | oU |
| NUCB1 | 294 | 337 | 436 | 1.148 | 1.483 | o | U | oU |
| SH3BGRL3 | 221 | 271 | 327 | 1.224 | 1.479 | o | U | oU |
| WDR75 | 115 | 95 | 81 | 0.830 | 0.705 | o | D | oD |
| BIRC3 | 246 | 226 | 173 | 0.918 | 0.703 | o | D | oD |
| CDKN2AIP | 132 | 101 | 93 | 0.766 | 0.702 | o | D | oD |
| DYNLL2 | 133 | 115 | 93 | 0.865 | 0.702 | o | D | oD |
| EIF2S3 | 193 | 146 | 135 | 0.756 | 0.702 | o | D | oD |
| ASAP1 | 138 | 114 | 97 | 0.826 | 0.701 | o | D | oD |
| KCTD6 | 149 | 116 | 105 | 0.774 | 0.700 | o | D | oD |
| PSME2 | 205 | 180 | 144 | 0.877 | 0.700 | o | D | oD |
| MORF4L1 | 193 | 149 | 135 | 0.772 | 0.698 | o | D | oD |
| MTF1 | 124 | 95 | 84 | 0.771 | 0.676 | o | D | oD |
| PECI | 126 | 131 | 85 | 1.043 | 0.675 | o | D | oD |
| PDCD4 | 124 | 96 | 83 | 0.779 | 0.672 | o | D | oD |
| HIST1H4C | 1638 | 1370 | 1093 | 0.836 | 0.667 | o | D | oD |
| BCLAF1 | 199 | 159 | 130 | 0.800 | 0.653 | o | D | oD |
| EIF3E | 661 | 601 | 427 | 0.910 | 0.647 | o | D | oD |
| LSM5 | 260 | 218 | 166 | 0.839 | 0.639 | o | D | oD |
| H3F3A | 974 | 739 | 616 | 0.758 | 0.632 | o | D | oD |
| FRG1 | 160 | 124 | 99 | 0.773 | 0.614 | o | D | oD |
| EIF3M | 174 | 131 | 106 | 0.757 | 0.613 | o | D | oD |
| CDC42SE2 | 203 | 161 | 119 | 0.796 | 0.590 | o | D | oD |

Example 2—CD3+ Activation after Administration of LDN

Peripheral-blood mononuclear cells were isolated from whole blood or from the residue product of leukoreduction of whole blood from pathologically healthy donors using Histopaque-1077. The mononuclear fraction was harvested and red blood cell contamination removed by incubation in hypotonic ammonium chloride. Cells were washed in phosphate buffered saline (PBS) and platelet contamination removed by centrifugation at 200 g for 10 min, re-suspended at a concentration of $1 \times 10^6$ ml in RPMI-1640 culture medium. To these naltrexone was added at a concentration of either 10 uM of a conventional higher dose of naltrexone (NTX) or 10 nM low-dose naltrexone (LDN), and incubated for 48 h in a humidified atmosphere with 5% $CO_2$ in air at 37° C. Peripheral-blood mononuclear cells were washed twice in wash buffer (PBS containing 1% (v/v) FBS and 0.09% (v/v) NaN$_3$), and stained for 30 min at 4° C. with the relevant and stated antibodies for assessment of immune cell profile. Cells were washed in wash buffer and fixed in 4% paraformaldehyde for 20 min at 4° C. Expressions of the surface markers were analysed using a BD Science LSR II Flow Cytometer with dedicated proprietary software.

RESULTS

The activation state of CD3+ cells is indicated by CD69 expression; higher levels of CD69 expression correlate with increased CD3+ activation. CD3+ cells are T cell co-receptors that help to activate both the cytotoxic T cell (CD8+ naive T cells) and also T helper cells (CD4+ naive T cells). FIG. 1 shows that the CD69 expression in CD3+/CD8+ cells (killer T-cells) increased after being cultured with LDN, but after being cultured with NTX or the vehicle control (DMSO) the CD69 expression did not increase. Thus, when LDN has completed its priming and the gene expressions are as determined in Example 1, the immune system is suitably boosted.

The invention claimed is:
1. A method for the treatment of a subject, comprising:
   (i) administering an active that is naltrexone or a metabolite or analogue thereof, wherein the metabolite or analogue is 6-β-naltrexol, naloxone or methylnaltrexone, and
   (ii) if the gene expression profile of any of the genes listed in a) in a sample of CD3+ cells obtained from the subject undergoing treatment is increased compared to a control, or if any of the genes listed in b) in a sample of CD3+ cells obtained from the subject undergoing treatment is decreased compared to a control, administering a further treatment drug to the subject,
wherein a) is:
   a) i. S100 calcium binding protein A6, mRNA;
      ii. RAS protein activator like 3, mRNA;
      iii. Mitogen-activated protein kinase kinase kinase kinase 1, mRNA;
      iv. Tyrosine 3-monooxygenase/tryptophan 5-monooxygenase, mRNA;
      v. DR1-associated protein 1 (negative cofactor alpha 2), mRNA;
      vi. Castor zinc finger 1, transcript variant 2, mRNA;
      vii. Aldehyde dehydrogenase 4 family, member A1, mRNA;
      viii. Phenylalanine hydroxylase, mRNA;
      ix. Myosin, light polypeptide kinase, transcript variant 5, mRNA;
      x. Eukaryotic translation initiation factor 4B, mRNA;
      xi. Olfactory receptor, family 10, subfamily A, member 6, mRNA;
      xii. Ezrin, transcript variant 1, mRNA;
      xiii. Actin, beta, mRNA;
      xiv. PRP8 pre-mRNA processing factor 8 homolog (S. cerevisiae),mRNA;
      xv. Integrin, beta 2 (complement component 3 receptor 3 and 4),mRNA;
      xvi. Hippocalcin-like 1, transcript variant 2, mRNA;
      xvii. Sparc/osteonectin, cwcv and kazal-like domains proteoglycan 2, mRNA;
      xviii. Poliovirus receptor-related 2 (herpesvirus entry mediator B), mRNA; or
      xix. Nucleobindin 1, mRNA;

and b) is:
   b) i. WD repeat domain 75, mRNA;
      ii. Baculoviral IAP repeat-containing 3, transcript variant, mRNA;
      iii. CDKN2A interacting protein, mRNA;
      iv. Dynein, light chain, LC8-type 2, mRNA;
      v. Eukaryotic translation initiation factor 2, subunit 3 gamma, mRNA;
      vi. Potassium channel tetramerisation domain containing 6, mRNA;
      vii. Proteasome (prosome, macropain) activator subunit 2, mRNA;
      viii. Mortality factor 4 like 1, transcript variant 2, mRNA;
      ix. Metal-regulatory transcription factor 1, mRNA;
      x. Peroxisomal D3,D2-enoyl-CoA isomerase, transcript, mRNA;
      xi. Programmed cell death 4 (neoplastic transformation inhibitor),mRNA;
      xii. Histone cluster 1, H4c, mRNA;
      xiii. BCL2-associated transcription factor 1, transcript variant, mRNA;
      xiv. Eukaryotic translation initiation factor 3, subunit E, mRNA;
      xv. LSM5 homolog, U6 small nuclear RNA associated (S. cerevisiae),mRNA;
      xvi. H3 histone, family 3A, mRNA;
      xvii. Eukaryotic translation initiation factor 3, subunit M, mRNA; or
      xviii. CDC42 small effector 2, transcript variant 2, mRNA;
in a sample of CD3+ cells obtained from the subject undergoing treatment.

2. The method according to claim 1, further comprising determining the gene expression profile of three or more of the genes.

3. The method according to claim 1, further comprising determining the expression profile of one or more of the genes S100 calcium binding protein A6, RAS protein activator like 3, Mitogen-activated protein kinase kinase kinase kinase 1, Tyrosine 3-monooxygenase/tryptophan 5-monooxygenase, mRNA and DR1-associated protein 1 (negative cofactor alpha 2).

4. The method according to claim 3, further comprising determining the expression profile of each of the genes S100 calcium binding protein A6, RAS protein activator like 3, Mitogen-activated protein kinase kinase kinase kinase 1, Tyrosine 3-monooxygenase/tryptophan 5-monooxygenase, and DR1-associated protein 1 (negative cofactor alpha 2).

5. The method according to claim 1, further comprising determining the expression profile of genes WD repeat domain 75, Baculoviral IAP repeat-containing 3, transcript variant, CDKN2A interacting protein, Dynein, light chain, LC8-type 2, and Eukaryotic translation initiation factor 2, subunit 3 gamma.

6. The method according to claim 5, further comprising determining the expression profile of each of the genes WD repeat domain 75, Baculoviral IAP repeat-containing 3, transcript variant, CDKN2A interacting protein, Dynein, light chain, LC8-type 2, and Eukaryotic translation initiation factor 2, subunit 3 gamma, is determined.

7. The method according to claim 1, wherein the active is naltrexone or 6-β-naltrexol.

8. The method according to claim 1, wherein the active is administered at a level of a daily amount of no more than 4.5 mg.

9. The method of claim 8, wherein the daily amount is between 3 and 4.5 mg.

10. The method according to claim 1, wherein the subject has cancer.

11. The method of claim 10, wherein the cancer is selected from the group consisting of breast cancer, lung cancer, melanoma cancer, colon cancer, or glioma cancer.

12. The method according to claim 1, wherein the treatment is cancer treatment.

13. The method according to claim 12, wherein the cancer treatment is chemotherapy, radiation therapy, hormonal therapy or immunotherapy.

14. The method according to claim 1, wherein the treatment is HIV/AIDS treatment.

15. The method of claim 14, wherein the HIV/AIDS treatment is an antiretroviral therapy.

16. The method according to claim 1, wherein the control is a sample obtained from the subject prior to treatment.

17. The method according to claim 1, further comprising determining the gene expression profile in a sample obtained at least 24 hours after treatment.

18. The method according to claim 17, wherein the sample is obtained at least 48 hours after treatment.

19. The method according to claim 1, wherein the CD3+ cells are obtained from a blood sample from the subject.

20. A method for the treatment of a subject, comprising:
(i) administering an active that is naltrexone or a metabolite or analogue thereof, wherein the metabolite or analogue is 6-β-naltrexol, naloxone or methylnaltrexone, and
(ii) if the gene expression profile of any of the genes listed in a) in a sample of CD3+ cells obtained from the subject undergoing treatment is not increased compared to a control, or if any of the genes listed in b) in a sample of CD3+ cells obtained from the subject undergoing treatment is not decreased compared to a control, re-administering the active to the subject, wherein a) is:

a) i. S100 calcium binding protein A6, mRNA;
ii. RAS protein activator like 3, mRNA;
iii. Mitogen-activated protein kinase kinase kinase kinase 1, mRNA;
iv. Tyrosine 3-monooxygenase/tryptophan 5-monooxygenase, mRNA;
v. DR1-associated protein 1 (negative cofactor alpha 2), mRNA;
vi. Castor zinc finger 1, transcript variant 2, mRNA;
vii. Aldehyde dehydrogenase 4 family, member A1, mRNA;
viii. Phenylalanine hydroxylase, mRNA;
ix. Myosin, light polypeptide kinase, transcript variant 5, mRNA;
x. Eukaryotic translation initiation factor 4B, mRNA;
xi. Olfactory receptor, family 10, subfamily A, member 6, mRNA;
xii. Ezrin, transcript variant 1, mRNA;
xiii. Actin, beta, mRNA;
xiv. PRP8 pre-mRNA processing factor 8 homolog (*S. cerevisiae*),mRNA;
xv. Integrin, beta 2 (complement component 3 receptor 3 and 4),mRNA;
xvi. Hippocalcin-like 1, transcript variant 2, mRNA;
xvii. Sparc/osteonectin, cwcv and kazal-like domains proteoglycan 2, mRNA;
xviii. Poliovirus receptor-related 2 (herpesvirus entry mediator B), mRNA; or
xix. Nucelobindin 1, mRNA;
and b) is:
b) i. WD repeat domain 75, mRNA;
ii. Baculoviral IAP repeat-containing 3, transcript variant, mRNA;
iii. CDKN2A interacting protein, mRNA;
iv. Dynein, light chain, LC8-type 2, mRNA;
v. Eukaryotic translation initiation factor 2, subunit 3 gamma, mRNA;
vi. Potassium channel tetramerisation domain containing 6, mRNA;
vii. Proteasome (prosome, macropain) activator subunit 2, mRNA;
viii. Mortality factor 4 like 1, transcript variant 2, mRNA;
ix. Metal-regulatory transcription factor 1, mRNA;
x. Peroxisomal D3,D2-enoyl-CoA isomerase, transcript, mRNA;
xi. Programmed cell death 4 (neoplastic transformation inhibitor),mRNA;
xii. Histone cluster 1, H4c, mRNA;
xiii. BCL2-associated transcription factor 1, transcript variant, mRNA;
xiv. Eukaryotic translation initiation factor 3, subunit E, mRNA;
xv. LSM5 homolog, U6 small nuclear RNA associated (*S. cerevisiae*),mRNA;
xvi. H3 histone, family 3A, mRNA;
xvii. Eukaryotic translation initiation factor 3, subunit M, mRNA; or
xviii. CDC42 small effector 2, transcript variant 2, mRNA;
in a sample of CD3+ cells obtained from the subject undergoing treatment.

* * * * *